(12) United States Patent
Huynh et al.

(10) Patent No.: US 7,904,286 B2
(45) Date of Patent: Mar. 8, 2011

(54) METHOD AND APPARATUS FOR SCHEDULING TEST VECTORS IN A MULTIPLE CORE INTEGRATED CIRCUIT

(75) Inventors: Duy Quoc Huynh, Cedar Park, TX (US); Gahn Wattanadilok Krishnakalin, Austin, TX (US); Giang Chau Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 11/855,345

(22) Filed: Sep. 14, 2007

(65) Prior Publication Data

US 2009/0077441 A1    Mar. 19, 2009

(51) Int. Cl.
  *G06F 17/50* (2006.01)
  *G01R 31/28* (2006.01)
  *H03K 17/693* (2006.01)
  *H03K 19/00* (2006.01)

(52) U.S. Cl. .................. 703/14; 703/19; 716/1; 716/4; 716/6; 714/741

(58) Field of Classification Search .............. 703/14, 703/19; 716/1, 4, 6; 714/741
See application file for complete search history.

(56) References Cited

U.S. PATENT DOCUMENTS

| | | | | |
|---|---|---|---|---|
| 4,320,509 A | * | 3/1982 | Davidson | 714/732 |
| 5,650,938 A | * | 7/1997 | Bootehsaz et al. | 716/6 |
| 6,477,673 B1 | | 11/2002 | Ferrant et al. | |
| 6,651,225 B1 | * | 11/2003 | Lin et al. | 716/4 |
| 6,785,873 B1 | * | 8/2004 | Tseng | 716/4 |
| 6,833,724 B2 | | 12/2004 | Binkley et al. | |
| 6,934,897 B2 | | 8/2005 | Mukherjee et al. | |
| 6,980,943 B2 | * | 12/2005 | Aitken et al. | 703/14 |
| 7,043,389 B2 | | 5/2006 | Plusquellic | |
| 7,111,198 B2 | * | 9/2006 | Liu et al. | 714/25 |
| 7,460,988 B2 | * | 12/2008 | Higashi | 703/13 |

OTHER PUBLICATIONS

"Between-Core Vector Overlapping for Test Cost Reduction in Core Testing", Tsuyoshi Shinogi, 12$^{th}$ Asian Test Symposium (ATS '03). Nov. 16-19, 2003.*

"A Reconfigurable Power-Conscience Core Wrapper and its Application to SOC Test Scheduling", Eric Larsson and Zebo Peng, Embedded Systems Laboratory. Linkopings Universitet, Sweden. ITC International Test Conference, 2003.*

* cited by examiner

*Primary Examiner* — Paul L Rodriguez
*Assistant Examiner* — Nithya Janakiraman
(74) *Attorney, Agent, or Firm* — David A. Mims; Robert C. Rolnik (57) ABSTRACT

A computer implemented method, apparatus and computer program product for extending test coverage in a simulated multiple core integrated circuit. The simulator applies at a first time a first test vector on the simulated multiple core integrated circuit, the first test vector having a duration. The simulator may also apply a second test vector at a second time before the duration but substantially after the first time. The simulator can collect a response from the multiple core integrated circuit based on the first test vector and the second test vector.

19 Claims, 9 Drawing Sheets

```
initial begin
501 {  enterdelay = ({$random(dlyseed)} % 200) + 200;
       $display("= = = = = %t - enterdelay=%d = = = = =",$time,enterdelay);

502 {  repeat (enterdelay) @ (posedge tb.SYS_PLBCLK);
       $display("= = = = =%t - Start DDR Test through random clock count control = = = = =",$time);

503 {  tb.TB_SYNCH_OUT[2] = 1'b1;
       repeat (2) @ (posedge tb.SYS_PLBCLK);
       tb.TB_SYNCH_OUT[2] = 1'b0;
       end

[MASTER_1]
set_device(type=PLB5_MASTER)
511 { wait(level=2)
512 { read(addr=50000000001003a1,size=32,type=1,priority=2,reorderable=false,outoforderrden=true)
      read(addr=5000000000100302,size=156,type=0,priority=1,reorderable=false,outoforderrden=false)
      write(addr=5000000000100320,size=62,type=0,priority=2,reorderable=true,postponeen=false)
      read(addr=5000000000100389,size=119,type=0,priority=1,reorderable=false,outoforderrden=true)
      write(addr=5000000000100326,size=112,type=0,priority=1,reorderable=false,postponeen=true)
      read(addr=500000000010037f,size=32,type=1,priority=1,reorderable=true,outoforderrden=true)
      write(addr=500000000010039a,size=102,type=0,priority=3,reorderable=true,postponeen=false)
      read(addr=5000000000100331,size=256,type=1,priority=1,reorderable=false,outoforderrden=true)
      write(addr=500000000010039d,size=99,type=0,priority=0,reorderable=true,postponeen=false)
      read(addr=500000000010036d,size=65,type=1,priority=1,reorderable=false,outoforderrden=true)
      write(addr=50000000001003ae,size=82,type=0,priority=3,reorderable=true,postponeen=true)
      read(addr=5000000000100359,size=65,type=1,priority=1,reorderable=true,outoforderrden=false)
      read(addr=50000000001003eb,size=21,type=0,priority=0,reorderable=true,outoforderrden=true)
      write(addr=5000000000100353,size=189,type=0,priority=3,reorderable=false,postponeen=false)
      write(addr=50000000001003e2,size=30,type=0,priority=3,reorderable=true,postponeen=false)
```

```
[MASTER_1]
set_device(type=PLB5_MASTER)

701 { wait(level=2) //7

702 {
read(addr=40000000000100003a1,size=32,type=1,priority=2,reorderable=false,outoforderden=true) //7
read(addr=4000000000010000302,size=146,type=0,priority=1,reorderable=false,outoforderden=false) //7
write(addr=4000000000010000320,size=62,type=0,priority=2,reorderable=true,postponeen=false) //7
read(addr=4000000000010000389,size=119,type=0,priority=1,reorderable=false,outoforderden=true) //7
write(addr=4000000000010000326,size=112,type=0,priority=1,reorderable=false,postponeen=true) //7
read(addr=400000000001000037f,size=32,type=1,priority=1,reorderable=true,outoforderden=true) //7
write(addr=400000000001000039a,size=102,type=0,priority=3,reorderable=true,postponeen=false) //7
read(addr=4000000000010000331,size=256,type=1,priority=1,reorderable=false,outoforderden=true) //7
write(addr=400000000001000039d,size=99,type=0,priority=0,reorderable=true,postponeen=false) //7
read(addr=400000000001000036d,size=64,type=1,priority=1,reorderable=false,outoforderden=true) //7
write(addr=40000000000100003ae,size=82,type=0,priority=3,reorderable=true,postponeen=true) //7
read(addr=4000000000010000349,size=64,type=1,priority=1,reorderable=true,outoforderden=false) //7
read(addr=40000000000100003eb,size=21,type=0,priority=0,reorderable=true,outoforderden=true) //7
write(addr=4000000000010000343,size=189,type=0,priority=3,reorderable=false,postponeen=false) //7
write(addr=40000000000100003e2,size=30,type=0,priority=3,reorderable=true,postponeen=false) //7
}

FROM FIG. 7A

[MASTER_3]
set_device(type=PLB5_MASTER)

703 {
mem_write(addr=0000000000080000,size=16,data=f836244c92b35b496fac9e2cb9aba639,mesi_state=i)
mem_write(addr=0000000000080010,size=16,data=f701b4d4787c3b59af53e8f9194c085f,mesi_state=i)
mem_write(addr=0000000000080020,size=16,data=2ec1cac8a1d4e85e57e84c895e33dccf,mesi_state=i)
mem_write(addr=0000000000080030,size=16,data=a9063dedec1c47a9e81259ba7fd4ba35,mesi_state=i)
mem_write(addr=0000000000080040,size=16,data=c03a62528cc64ce20deedccafa8b9665,mesi_state=i)
mem_write(addr=0000000000080050,size=16,data=690db5f41ba58878656323e1d6c6c2c3,mesi_state=i)
mem_write(addr=0000000000080060,size=16,data=76c6d4d48369135c6313af85fa12819,mesi_state=i)
mem_write(addr=0000000000080070,size=16,data=ee0c2d0f645f5841e83122971484cada,mesi_state=i)
mem_write(addr=0000000000080080,size=16,data=d3b4a73d1db3f29d9b040c697df97ca4,mesi_state=m)
mem_write(addr=0000000000080090,size=16,data=f589dc6e91183a5c551517784e1bab09,mesi_state=m)
mem_write(addr=00000000000800a0,size=16,data=182e48cd9d5d7a9cfa2021861f9295226,mesi_state=m)
mem_write(addr=00000000000800b0,size=16,data=a44fc0c5d224cc0c62c835f2e1b33d9d,mesi_state=m)
mem_write(addr=00000000000800c0,size=16,data=c7354b0393fb60c3c96a4b9ed7ea52f2,mesi_state=i)
mem_write(addr=00000000000800d0,size=16,data=a27ee717b0210e4d7a7b509278cdacf4,mesi_state=i)
mem_write(addr=00000000000800e0,size=16,data=a524a8cd7b6610026629c9f6b610035a,mesi_state=i)
mem_write(addr=00000000000800f0,size=16,data=88e30b0766e76e9c5c678f7ead0a1549,mesi_state=i)
mem_write(addr=0000000000080100,size=16,data=de45d7c7976594ed023c57e9b9b3c189,mesi_state=i)
} wait(level=3)

704 { send(level=2, master_idle=true) //3 to trigger other streams if used 705 {
--DMA Register SG_DESCRIPTOR_ADDRESS_HIGH_1
write(addr=b00000000000000a0,size=4,type=0,data=00000003) //3
--DMA Register SG_DESCRIPTOR_ADDRESS_LO_1
write(addr=b00000000000000a4,size=4,type=0,data=001103fa0) //3
--DMA Register SG_COMMAND_1
write(addr=b00000000000000c0,size=4,type=0,data=80000000) //3
}

```
initial begin

901 {  repeat (3) @ (posedge tb.dma2plb5.0_DMA_PLBM_REQUEST);

902 {  tb.TB_SYNCH_OUT[2] = 1'b1;
       repeat (2) @ (posedge tb.SYS_PLBCLK);
       tb.TB_SYNCH_OUT[2] = 1'b0;
    end

[MASTER_1]
    set_device(type=PLB5_MASTER)

903 {  wait(level=2) //7 read(addr=40000000000100003a1,size=32,type=1,priority=2,reorderable=false,outoforderrden=true) //7
       read(addr=4000000000010302,size=146,type=0,priority=1,reorderable=false,outoforderrden=false) //7
       write(addr=4000000000010320,size=62,type=0,priority=2,reorderable=true,postponeen=false) //7
       read(addr=4000000000010389,size=119,type=0,priority=1,reorderable=false,outoforderrden=true) //7
       write(addr=40000000000100326,size=112,type=0,priority=1,reorderable=false,postponeen=true) //7
       read(addr=400000000001037f,size=32,type=1,priority=1,reorderable=true,outoforderrden=true) //7
904 {  write(addr=400000000001039a,size=102,type=0,priority=3,reorderable=true,postponeen=false) //7
       read(addr=40000000000100331,size=256,type=1,priority=1,reorderable=false,outoforderrden=true) //7
       write(addr=400000000001039d,size=99,type=0,priority=0,reorderable=true,postponeen=false) //7
       read(addr=400000000001036d,size=64,type=1,priority=1,reorderable=false,outoforderrden=true) //7
       write(addr=40000000000103ae,size=82,type=0,priority=3,reorderable=true,postponeen=true) //7
       read(addr=40000000000100349,size=64,type=1,priority=1,reorderable=true,outoforderrden=false) //7
       read(addr=40000000000103eb,size=21,type=0,priority=0,reorderable=true,outoforderrden=true) //7
       write(addr=40000000000100343,size=189,type=0,priority=3,reorderable=false,postponeen=false) //7
       write(addr=40000000000103e2,size=30,type=0,priority=3,reorderable=true,postponeen=false) //7
```

METHOD AND APPARATUS FOR SCHEDULING TEST VECTORS IN A MULTIPLE CORE INTEGRATED CIRCUIT

BACKGROUND OF THE INVENTION

1. Field of the Invention

The present invention relates generally to circuit testing and verification. More particularly the present invention relates to a computer implemented method, apparatus and computer program product, in a simulated multiple core integrated circuit, to adjust the time of applying stimuli in the form of first test vector to apply stimuli in the form of a second test vector.

2. Description of the Related Art

As transistor densities in integrated circuits climb, developers have responded by building systems on a chip (SOC). A system on a chip integrates many and sometimes all logical components of a computer within a single integrated circuit. In addition, digital, analog, mixed-signal and radio frequency functions may be placed on a common chip.

As individual chips have become more complex, testing of the SOC has become more challenging. When chip circuit densities were less than half of current circuit densities, a design would be fabricated and attached to a bed-of-nails in order to apply signals directly to the circuits and monitor actual circuit responses. However, such a methodology created unwanted delays in fabricating prototypes, discovering defects and repeating the process on revised prototypes. Consequently, testers of SOCs and other complex integrated circuits moved to an approach of simulating the electrical properties of newly designed circuits.

The design process includes a first step of designing a circuit using Verilog™ or Very High-level Design Language (VHDL). Next designers test circuits at the unit level. Next, the designers test the system as a whole, that is, perform system testing. Verilog™ is a trademark of Cadence, Inc. On one hand, a unit test comprises simulating a component of a SOC. A component can include a microprocessor, bus bridges, direct memory access circuits, and the like. On the other hand, system testing comprises tests on several or all components expected to be placed on a chip or in a package. System testing often includes multiple components communicating over one or more busses. Consequently, some processing occurs in parallel. Thus, test coverage of multiple processes occurring in parallel will potentially reveal defects. Alternatively, broad test coverage may provide some assurance that parallel processing will not cause any errors during production and use of the device under test.

During system testing, test vectors are applied to the SOC so that some operations of each test vector occur concurrently. A tester may trigger test vectors to begin contemporaneously. One vector completes before the second vector. Defects caused by concurrent operation of the vectors will only be apparent for the duration that the vectors are both operating. Unfortunately, there is no testing of the parallel operation of the vectors during the interval after the shorter vector completes. Testers, manufacturers and integrated circuit customers would benefit if shorter test vectors were triggered to begin substantially after the start of a longer test vector.

SUMMARY OF THE INVENTION

The present invention provides a computer implemented method, apparatus and computer program product in a simulated multiple core integrated circuit for extending test coverage in a simulated multiple core integrated circuit. The simulator applies at a first time a first test vector on the simulated multiple core integrated circuit, the first test vector having a duration. The simulator may also apply a second test vector at a second time before the duration but substantially after the first time. The simulator can then collect a response from the multiple core integrated circuit, based on the first test vector and the second test vector.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is code for executing a test vector to randomly begin a short test vector on the simulated multiple core integrated circuit of FIG. 3 in accordance with an illustrative embodiment of the invention;

FIGS. 7A and 7B are code for executing a short test vector in response to a synch assertion code in accordance with a second illustrative embodiment of the invention;

FIG. 9 is code for executing a short test vector in response to a synch assertion code in accordance with a third illustrative embodiment of the invention.

DETAILED DESCRIPTION OF THE PREFERRED EMBODIMENT

Figure 1:
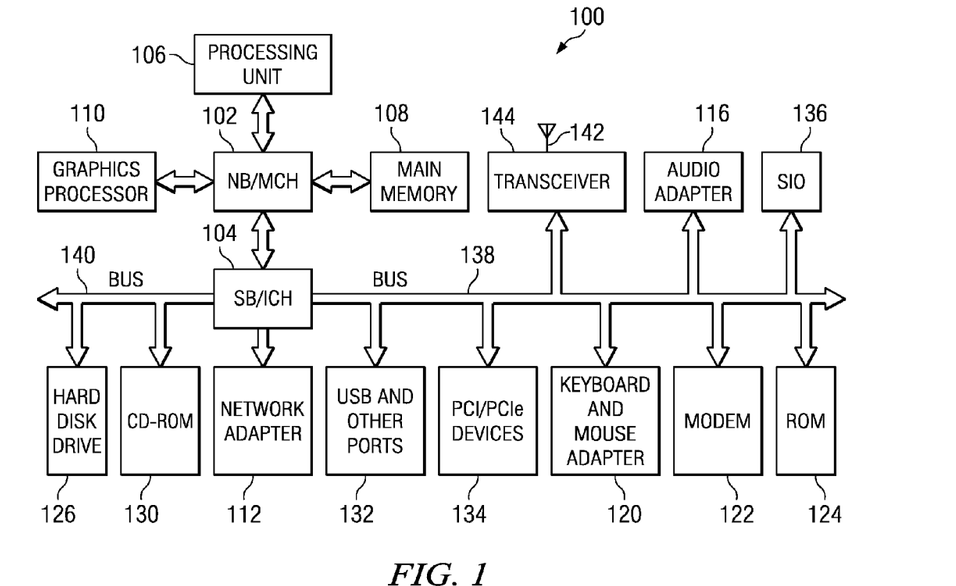
FIG. 1 is a data processing system in accordance with an illustrative embodiment of the invention.

With reference to FIG. 1, a block diagram of a data processing system is shown in which aspects of an illustrative embodiment may be implemented. Data processing system 100 is an example of a computer in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 are connected to north bridge and memory controller hub 102. Graphics processor 110 may be connected to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106 and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention are performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communication fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 and above-described examples are not meant to imply architectural limitations. For example, data processing system 100 also may be a tablet computer, laptop computer, or telephone device in addition to taking the form of a PDA.

The aspects of the illustrative embodiments provide a computer implemented method, apparatus and computer program product for adjusting the timing of a short test vector applied to a circuit in relation to the time of starting a second test vector or longer test vector. Accordingly, the time of completion of the second test vector may be varied across a plurality of relative offsets of time in the longer test vector. A test vector is a set of stimuli applied to inputs of simulated components under test. The test vector may be a series of stimuli applied over time.

Figure 2:
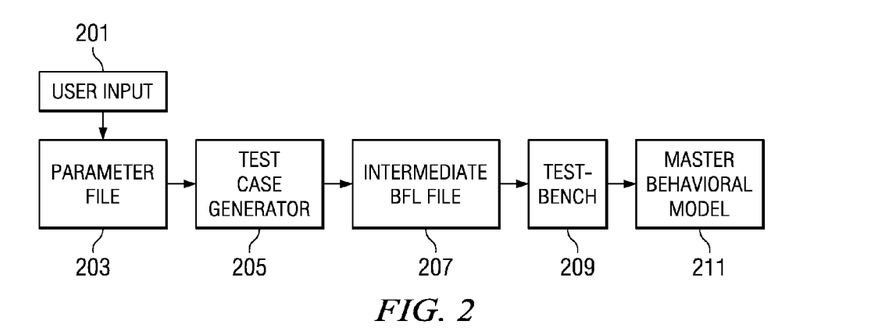
FIG. 2 shows a process where a test developer integrates test vectors into a simulated multiple core integrated circuit or multi-core circuit in accordance with an illustrative embodiment of the invention.

FIG. 2 shows a process where a test developer integrates test vectors into a simulated multiple core integrated circuit or multi-core circuit in accordance with an illustrative embodiment of the invention. Initially a user can enter parameters at a graphical user interface to form user inputs 201. Parameters may include, for example, file names for the chip design, the file name for a netlist, instructions to collect debugging information, and the like. When a user finishes entering parameters, she may save the inputs as parameter file 203. Test case generator 205 applies the parameters to a code, for example, C++ to form a base set of test vectors. Such test vectors may be compiled to form intermediate Bus Functional Language (BFL) 207. A bus functional language is a scripting language that defines various instructions to perform different types of bus transactions. The bus functional language is applied to test bench 209. The test bench may be, for example, a Verilog™ Procedural Interface operated on, for example, data processing system 100 of FIG. 1. The test bench instantiates the device under test as master behavioral model 211.

Figure 3:
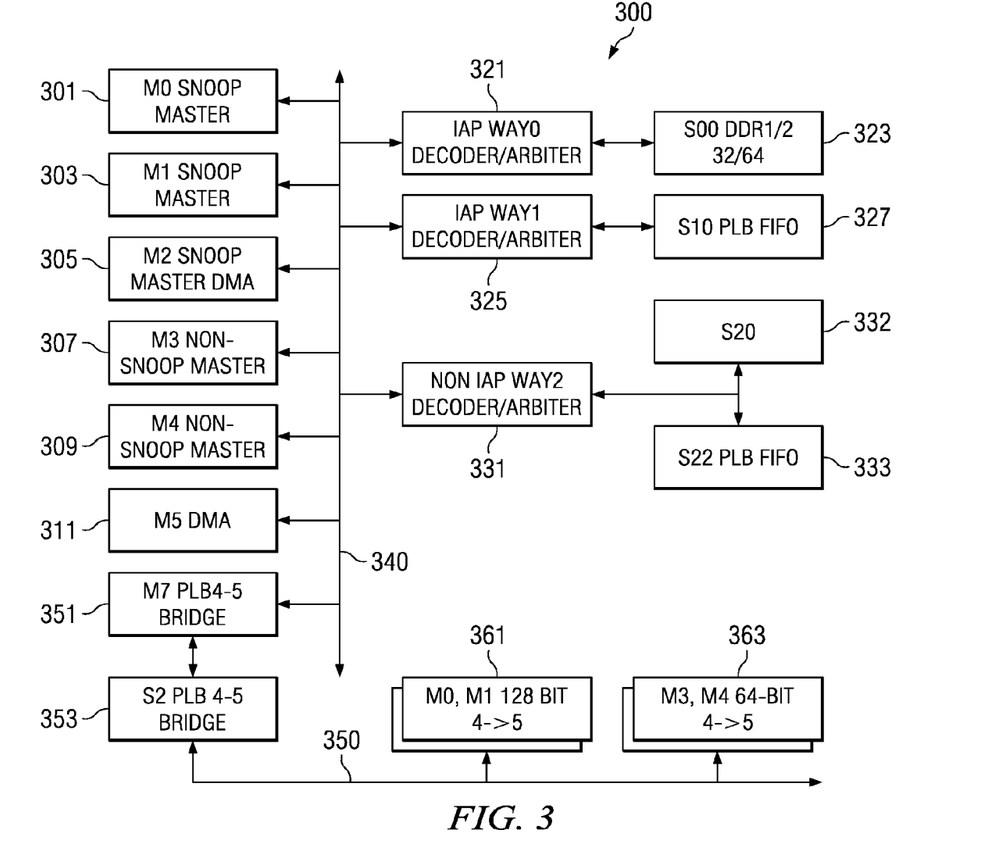
FIG. 3 shows a simulated multiple core integrated circuit under test in accordance with an illustrative embodiment of the invention.

FIG. 3 shows a simulated multiple core integrated circuit under test in accordance with an illustrative embodiment of the invention. The circuit components and topology can vary from one design to another. Accordingly, circuit 300 is an exemplary version of one possible device under test and simulated in a test bench. Circuit 300 includes, for example, M0 snoop master 301, M1 snoop master 303, M2 snoop master M5 Direct Memory Access (DMA) 305, M3 non-snoop master 307, M4 non-snoop master 309. Interconnect between these components and other components may occur using the processor local bus version 4 (PLB5) 340. Circuit 300 includes direct memory access M5 DMA 311, Intra-Address Pipelined (IAP) IAP way0 decoder/arbiter 321, S00 double data rate circuit 323. Circuit 300 includes IAP way1 decoder/arbiter 325 and S10 processor local bus first-in-first-out (FIFO) 327. Non-IAP way2 decoder/arbiter 331 interfaces S20 332 and S22 processor local bus FIFO 333. M5 DMA 305 can operate as a processor local bus version 5 master.

M7 processor local bus 4-5 bridge 351 interfaces to processor local bus version 4 (PLB4) 350 by way of S2 processor local bus 4-5 bridge 353. Further access to 128 bit (4→5) 361 and 64-bit (4→5) 363 can be available over the processor local bus 4 PLB4 350. Plural implementations of M0, M1 128 bit (4→5) 361 and M3, M4 64-bit (4→5) 363 may be simulated on the test bench. It may be desirable to test operation of direct memory accesses (DMA) and double data rate (DDR) operations across several components.

Figure 4:
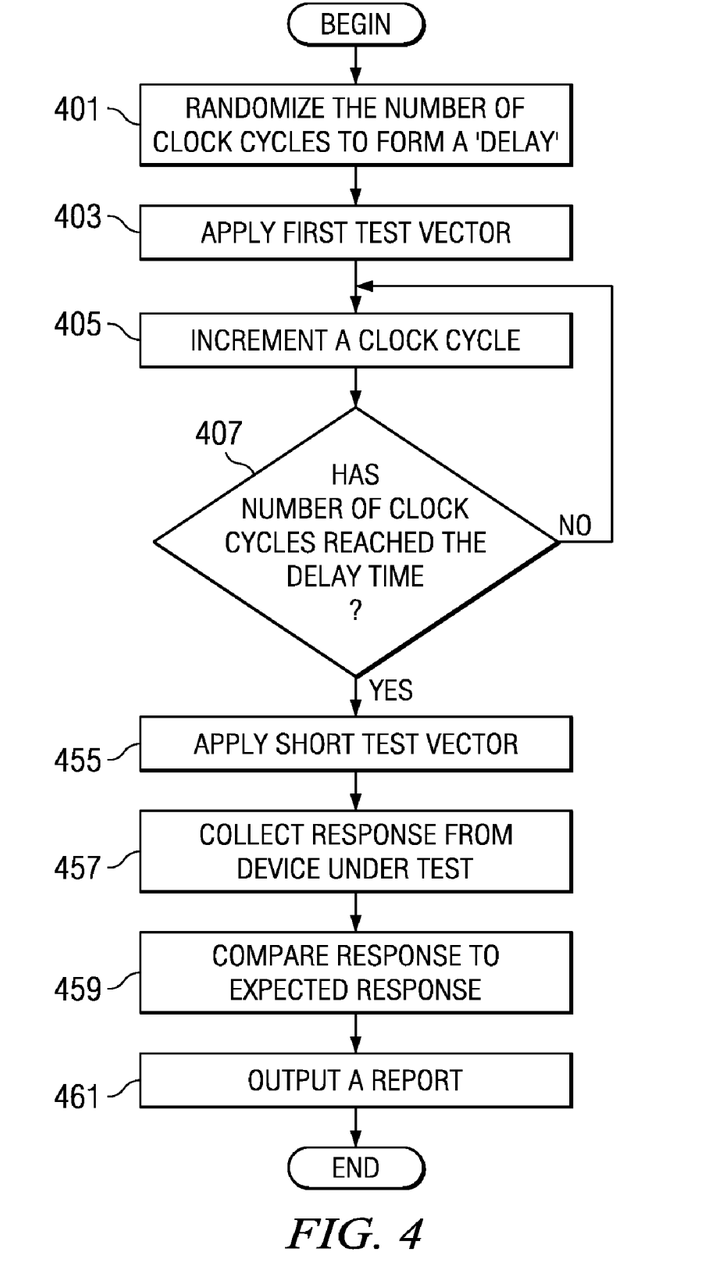
FIG. 4 is a flowchart for concurrently applying two test vectors to a simulated multiple core integrated circuit in accordance with an illustrative embodiment of the invention.

FIG. 4 shows a flowchart for concurrently applying two test vectors to a simulated multiple core integrated circuit in accordance with an illustrative embodiment of the invention. The flowchart steps may be performed on a data processing system operating the Verilog™ simulation software, also known as the simulator. The simulator can execute instructions of a test vector based on simulated clock cycles. The simulated multiple core integrated circuit may be according to multiple core integrated circuit 300 of FIG. 3. Initially, the simulator randomizes a number of clock cycles to form a delay (step 401). The simulator may pseudorandomly select an interval between a first test vector start time and a time that the first test vector completes operation. Accordingly, the simulator can pseudorandomly select by operating a pseudo-random number generator or algorithm. The simulator may receive a seed for the pseudorandom number generator as a parameter, as explained above in relation to FIG. 2. The first test vector may be the long test vector. The long test vector has a duration that it runs. The duration is the number of simulated clock cycles that the simulator applies the signals of the long test vector to the simulated multiple core integrated circuit. The delay can be a substantial delay. A substantial delay can be a duration of one or more simulated clock cycles of the device under test. A substantial delay can also be a duration longer than one tenth or 10 percent of the clock cycles of a long test vector applied to the device under test. In other words, the duration may be substantially after the first time when the simulator starts a second test vector at least 10 percent of the duration of the second test vector.

Next, the simulator applies a first test vector to the device under test (step 403). Step 403 may occur after, before, or during step 401. Applying the test vector means that the simulator will simulate currents, electric fields, voltages and the like in a geometry of the circuit in accordance with states and signals established by signals specified in the test vector. Next, the simulator increments a clock cycle (step 405). A determination is made as to whether the simulator has simulated a number of clock cycles to reach the delay time (step 407). A negative result causes the simulator to repeat step 405. Otherwise, the simulator exits the loop and applies the short test vector (step 455).

The simulator may collect a response from the device under test (step 457). A response is a state, predicted by the simulator, of a circuit measured as charge or signals stored at various nodes of the circuit. The states can include the logic values of registers and memory. Next, the simulator may compare the response to the expected response (step 459). An expected response is a predetermined set of logic values that correspond with nodes of the response. A set of tests may produce many results. The simulator may summarize the results by summarizing the output of the one or more tests in a report (step 461). A report is information stored to a file, rendered to a display, printed to a printout or other tangible summary of results. A report will indicate that contents of memory, registers, and the like match a predetermined correct set of data. The report may highlight the contents of any consistency check circuits. For example, the report may indicate that checksums are correct.

FIG. 5 is code for executing a test vector to randomly begin a short test vector on the simulated multiple core integrated circuit of FIG. 3, in accordance with a first illustrative embodiment of the invention. FIG. 5 is an example of Verilog code that may permit a computer implemented method to apply test vectors according to the flowchart of FIG. 4. Initially, a data processing system executes the code to set a pseudorandom number of clock cycles in code block 501. The data processing system executes instructions to cycle through the pseudorandom number of clock cycles in code block 502. Next, the code instructs the data processing system to assert a pulse to start the short test 503. The short test code includes a line to wait for the pulse 511. The next code block is the short test vector 512. The data processing system can execute additional code to initiate a long test vector at a time contemporaneous with the execution of instructions in code block 501.

Figure 6A:
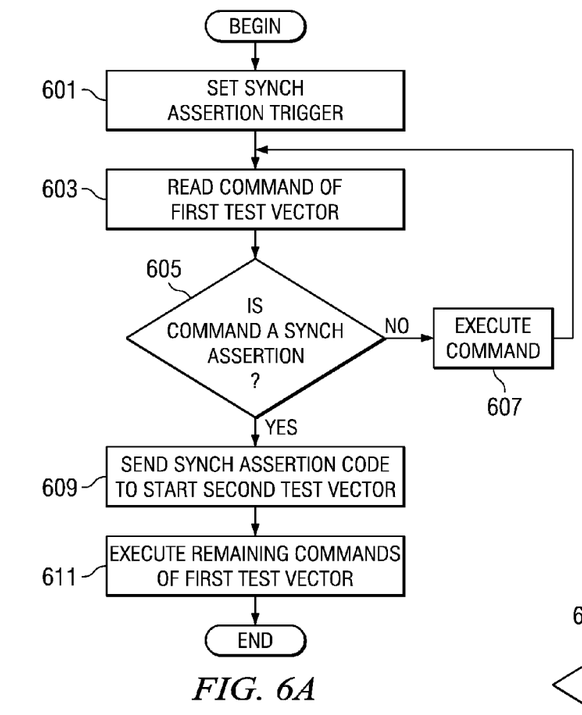
FIGS. 6A and 6B are flowcharts of a second illustrative embodiment of the invention.

FIG. 6A shows a flowchart of the second method to start a long test vector followed by a delayed short test vector on a simulated multiple core integrated circuit in accordance with an illustrative embodiment of the invention. Initially, the simulator may set the synch assertion trigger (step 601). Next, the simulator reads the commands (step 603). The simulator can determine if the command is a synch assertion (step 605). If not, the simulator executes the command (step 607). However, if the command is a synch assertion, the simulator may send the synch assertion code to start the second test vector (step 609). Next, the simulator may execute the remaining commands of the first test vector if any (step 611). As to the first test vector, processing terminates thereafter.

Figure 6B:
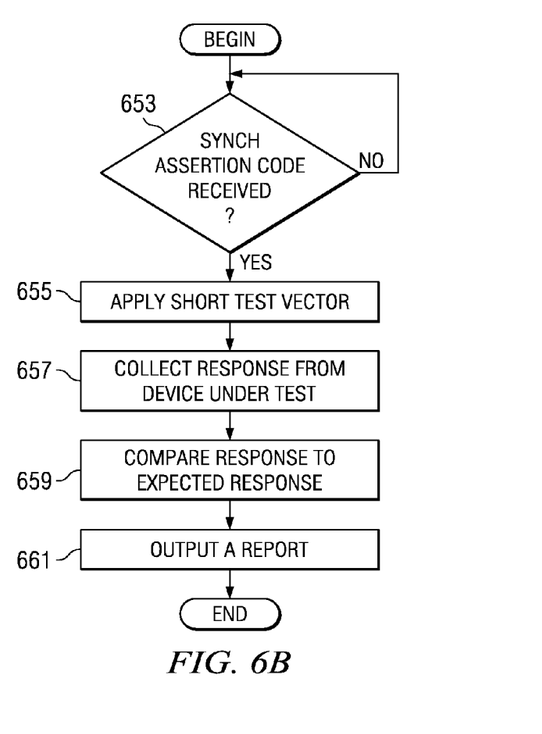

FIG. 6B shows a flowchart of the second test vector or short test vector in accordance with an illustrative embodiment of the invention. The simulator sets a wait command that initiates a periodic evaluation as to whether the synch assertion code is received (step 653). The synch assertion code is a transition from one logic state to a second logic state applied on a line of a control bus used to synchronize components of the device under test. If the evaluation is negative, the simulator repeatedly executes step 653. However, if the synch assertion code is received, the simulator applies the short test vector (step 655). The short test vector may be, for example, code block 702 of FIG. 7 below. Next, the simulator can collect a response from the device under test (step 657). Next, the simulator may compare the response to the expected response (step 659). During step 659 the simulator forms a comparison. The comparison is an indication of either equivalence between expected response and the response or an indication of signal differences noted between the expected response and the response. A set of tests may produce many results and comparisons. The simulator may summarize the results by summarizing the output of the one or more tests in a report (step 661).

FIGS. 7A and 7B are code for executing a short test vector in response to a synch assertion code in accordance with a second illustrative embodiment of the invention. When executed, the synch assertion code applies the synch signal in the test bench to the line of the control bus assigned to synchronize components of the device under test. The synch line may be asserted on a logic zero to logic one transition, or by a logic one to a logic zero transition. The choice of method depends on the form used by the designers of the device under test. In the example shown here, bit 2 of the control bus operates to synchronize the components of the device under test on a transition from a logic zero to a logic one. The code may stimulate the simulated multiple core integrated circuit 300 of FIG. 3.

FIGS. 7A and 7B are an example of Verilog code that may permit a computer implemented method to apply test vectors according to the flowchart of FIG. 6. Initially, a data processing system executes the code to periodically check for synch assertion code 701 until the simulator executes all instructions 700. Code block 702 is dependent on the test of code block 701 and executes only when the condition of code block 701 is met. In this case, wait(level=2) instructs the test bench to execute code block 702 if an assertion on bit 2 of the control bus is received. In this example, code block 703 is a first portion of the long test vector. Code block 703 is not dependent on a synch assertion code, and consequently begins promptly after the simulator initiates the test vectors. In response to the simulator completing execution of the first portion of the long test vector, the simulator executes code block 704. Code block 704 sends the synch assertion code. The corresponding code block 701 detects the set synch assertion code and begins concurrent execution of code block 702 as well as code block 705. Code block 705 is the second portion of the long test vector, in this case a series of direct memory access signals. Thus, following execution of code block 704, the simulator applies signals according to instructions of code block 702 contemporaneously with instructions of code block 704. Accordingly, defects associated with concurrent operations of the multiple core integrated circuit may be located.

Figures 8A, 8B:
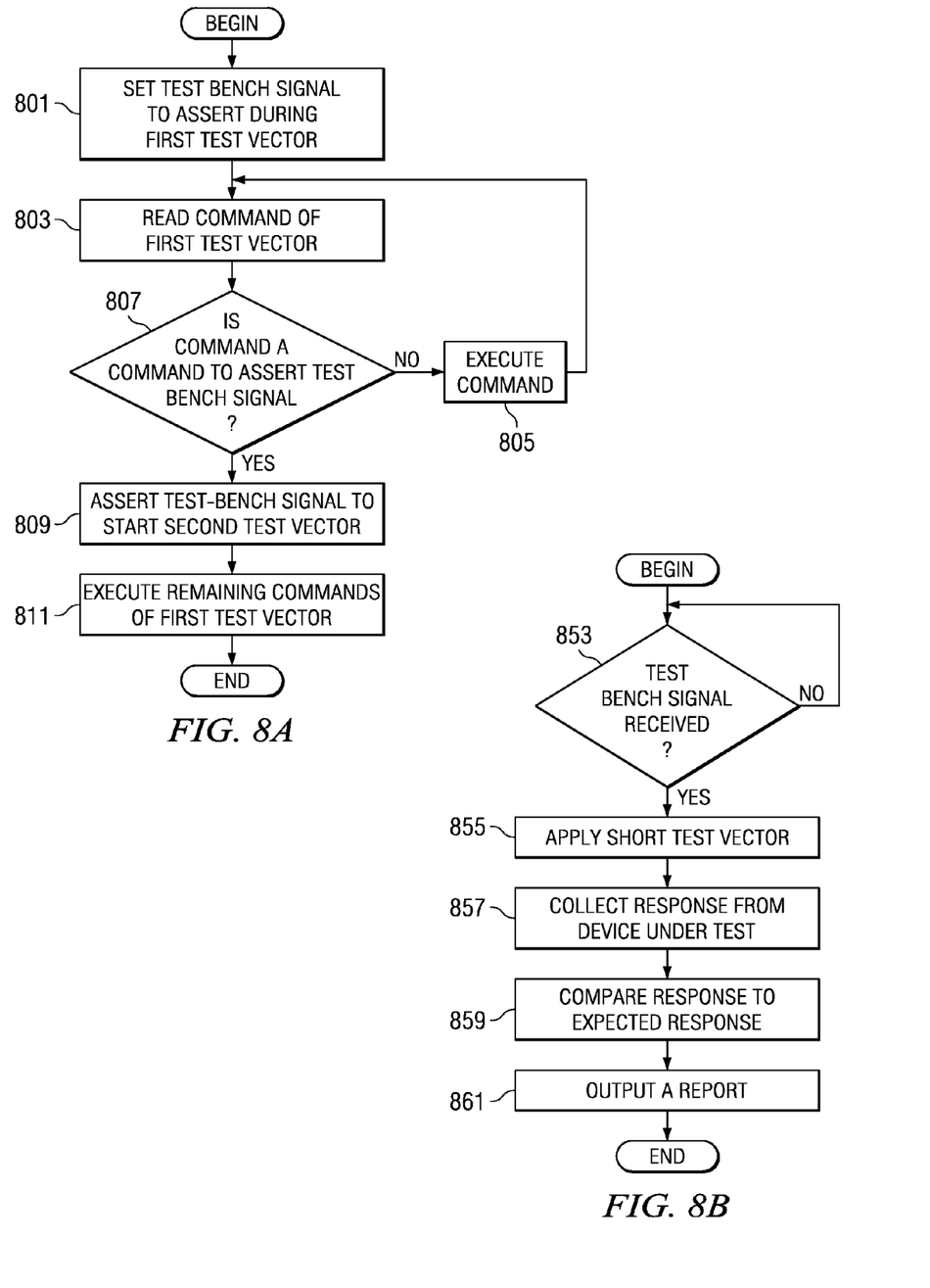
FIGS. 8A and 8B are flowcharts of a third illustrative embodiment of the invention.

FIG. 8A shows a flowchart in accordance with an illustrative embodiment of the invention. The simulator sets the test bench signal to assert during the first test vector (step 801).

The simulator reads a command of the first test vector (step 803). Next, the simulator determines whether the command is a command to assert a test bench signal (step 807). A test bench signal is any signal of the simulated circuit accessible through an executing digital simulation software, such as a data processing system running Verilog™. If the command is not a command to assert a test bench signal, the simulator executes the command (step 805) and continues to read a next command of the first test vector (step 803). However, if the command is a command to assert the test bench signal, the simulator asserts the test bench signal to start the second test vector (step 809). In addition, the simulator may execute any remaining commands of the first test vector (step 811).

FIG. 8B shows a flowchart of the short test vector applied to the multiple core integrated circuit in accordance with an illustrative embodiment of the invention. The simulator sets a wait command that initiates a periodic evaluation as to whether the test bench signal is received (step 853). If the evaluation is negative, the simulator repeatedly executes step 853. However, if the test bench signal is received, the simulator applies the short test vector (step 855). The short test vector may be, for example, code block 904 of FIG. 9 below. Next, the simulator can collect a response from the device under test (step 857). Next, the simulator may compare the response to the expected response (step 859). During step 859 the simulator forms a comparison. The comparison is an indication of either equivalence between expected response and the response or an indication of signal differences noted between the expected response and the response. A set of tests may produce many results and comparisons. The simulator may summarize the results by summarizing the output of the one or more tests in a report (step 861). The process terminates thereafter.

FIG. 9 is a code for executing a long test vector and short test vector in response to a synch assertion code in accordance with a third illustrative embodiment of the invention. FIG. 9 is an example of Verilog code that may permit a computer implemented method to apply test vectors according to the flowchart of FIGS. 8A and 8B. Code 900, in this example is written in Verilog™ code. However, it is appreciated that other circuit simulating code may be used. In this example, long test vector 901 is executing and periodically issuing test bench signals, for example, O_DMA_PLBM_REQUESTS or direct memory access/processor local bus request signal. Such request signals may include, for example, requests, abort commands, or re-arbitrate signals. As an example, a tester who wants to trigger a short test to start when a master 3 component Aborts may use an M3_Abort sensitive triggered repeat statement in place of a repeat statement using the O_DMA_PLBM_REQUEST signal. Contemporaneously, the simulator executes a code block that periodically detects the test bench signal and waits until a predetermined number of the test bench signals are detected, in this case, three. In response to detecting the third test bench signal, the simulator executes code block 902 which may assert a pulse to start the short test vector.

Short test vector code block 903 may periodically check for the pulse. In response to receiving the pulse, the simulator executes code block 903, the simulator continues to execute code block 904, the short test vector.

Thus, embodiments of the invention may permit adjustments to the concurrent operation of two test vectors such that varying instructions of the first test vector are exposed to concurrent interaction of instructions of the second test vector. Consequently, more design defects may be revealed than would otherwise be accessible in the instance of near concurrent startup of first and second test vectors. In addition, test vectors developed for unit verification can be easily reused in multicore verification without having to redevelop and manually integrate the tests of each core.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for extending test coverage in a simulated multiple core integrated circuit comprising:
    applying at a first time a first test vector on the simulated multiple core integrated circuit, the first test vector having a duration;
    applying a second test vector at a second time before the duration but substantially after the first time, wherein substantially after the first time comprises a delay interval of starting a second test vector at at least 10 percent of the duration of the first test vector; and collecting a response from the multiple core integrated circuit based on the first test vector and the second test vector.

2. The computer implemented method of claim 1, further comprising:
comparing the response to an expected response to form a comparison.

3. The computer implemented method of claim 2, further comprising:
outputting a report based on the comparison.

4. The computer implemented method of claim 1, wherein the second time is at an interval pseudorandomly selected between substantially after the first time and the duration.

5. The computer implemented method of claim 1, wherein the second time is based on a synch assertion code.

6. The computer implemented method of claim 1, wherein the second time is based on a test bench signal.

7. The computer implemented method of claim 1, wherein the first test vector has a shorter duration than the duration of the second test vector.

8. A data processing system comprising:
a bus;
a storage device connected to the bus, wherein computer usable code is located in the storage device;
a communication unit connected to the bus;
a processing unit connected to the bus, wherein the processing unit executes the computer usable code for extending test coverage in a simulated multiple core integrated circuit, the processing unit further executes the computer usable code to apply at a first time a first test vector on the simulated multiple core integrated circuit, the first test vector having a duration; apply a second test vector at a second time before the duration but substantially after the first time, wherein substantially after the first time comprises a delay interval of starting a second test vector at at least 10 percent of the duration of the first test vector; and
collect a response from the multiple core integrated circuit based on the first test vector and the second test vector.

9. The data processing system of claim 8, wherein the processing unit further executes the computer usable code to comparing the response to an expected response to form a comparison.

10. The data processing system of claim 9, wherein the processing unit further executes the computer usable code to output a report based on the comparison.

11. The data processing system of claim 8, wherein the second time is at an interval pseudorandomly selected between substantially after the first time and the duration.

12. The data processing system of claim 8, wherein the second time is based on a synch assertion code.

13. The data processing system of claim 8, wherein the second time is based on a test bench signal.

14. A computer program product for extending test coverage in a simulated multiple core integrated circuit comprising:
a computer readable storage medium;
first program instructions to apply at a first time a first test vector on the simulated multiple core integrated circuit, the first test vector having a duration;
second program instructions to apply a second test vector at a second time before the duration but substantially after the first time, wherein substantially after the first time comprises a delay interval of starting a second test vector at at least 10 percent of the duration of the first test vector; and
third program instructions to collect a response from the multiple core integrated circuit based on the first test vector and the second test vector, wherein the first, second and third program instructions are stored on the computer readable storage medium, wherein the computer readable storage medium is one selected from the group consisting of a semiconductor system, a semiconductor memory, solid-state memory, magnetic tape, a removable computer diskette, a random access memory (RAM), a read-only memory (ROM), a rigid magnetic disk and an optical disk.

15. The computer program product of claim 14, further comprising:
fourth program instructions to compare the response to an expected response to form a comparison, wherein the fourth program instructions are stored on the computer readable storage medium.

16. The computer program product of claim 15, further comprising:
fifth program instructions to output a report based on the comparison, wherein the fifth program instructions are stored on the computer readable storage medium.

17. The computer program product of claim 14, wherein the second time is at an interval pseudorandomly selected between substantially after the first time and the duration.

18. The computer program product of claim 14, wherein the second time is based on a synch assertion code.

19. The computer program product of claim 14, wherein the second time is based on a test bench signal.

* * * * *